(12) United States Patent
Buckanin et al.

(10) Patent No.: US 6,995,222 B2
(45) Date of Patent: Feb. 7, 2006

(54) COATING COMPOSITIONS WITH REACTIVE FLUORINATED COPOLYMERS HAVING PENDANT PERFLUOROPOLYETHER GROUPS

(75) Inventors: Richard S. Buckanin, Woodbury, MN (US); Gregory D. Clark, St. Paul, MN (US); Cheryl L. Elsbernd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/738,185

(22) Filed: Dec. 17, 2003

(65) Prior Publication Data

US 2005/0137355 A1   Jun. 23, 2005

(51) Int. Cl.
  *C08F 214/18* (2006.01)
(52) U.S. Cl. ............... 526/242; 526/307.5; 526/329.7; 525/374
(58) Field of Classification Search ................ 526/242, 526/307.5, 329.7; 525/374
  See application file for complete search history.

(56) References Cited

U.S. PATENT DOCUMENTS

| | | | |
|---|---|---|---|
| 3,350,808 A | | 11/1967 | Mitchell |
| 3,553,179 A | * | 1/1971 | Bartlett ..................... 526/246 |
| 5,623,037 A | | 4/1997 | Simeone et al. |
| 6,168,866 B1 | * | 1/2001 | Clark ......................... 428/421 |

FOREIGN PATENT DOCUMENTS

| | | |
|---|---|---|
| EP | 0 622 353 A2 | 11/1994 |
| EP | 0 870 778 A1 | 10/1998 |
| EP | 1 298 180 | 4/2003 |
| WO | WO 03/099904 A2 | 12/2003 |
| WO | WO 03/100158 A1 | 12/2003 |
| WO | WO 03/100159 A1 * | 12/2003 |

OTHER PUBLICATIONS

U.S. Appl. No. 10/331,816, Flynn et al., filed Dec. 30, 2002.
"*Amino Resins and Plastics*", *Kirk-Othmer Encyclopedia of Chemical Technology*, 4$^{th}$ Ed., vol. 2, pp. 604-637, John Wiley and Sons, 2000.
E.P. Pleuddeman, *Silane Coupling Agent*, Plenum Press, NY, pp 20-23 and 97 (1982).

* cited by examiner

Primary Examiner—Ling-Sui Choi
(74) Attorney, Agent, or Firm—Jean A. Lown

(57) ABSTRACT

Coating compositions are described that can be used to impart hydrophobicity, oleophobicity, stain resistance, or combinations thereof to various substrates. The coating compositions include an amino resin and a reactive fluorinated copolymer. The reactive fluorinated copolymer has pendant perfluoropolyether groups as well as pendant groups capable of reacting with the amino resin. The pendant perfluoropolyether groups of the reactive fluorinated copolymer have a molecular weight of at least 750 g/mole. Articles and methods of preparing articles using the coating compositions are also described.

17 Claims, No Drawings

COATING COMPOSITIONS WITH REACTIVE FLUORINATED COPOLYMERS HAVING PENDANT PERFLUOROPOLYETHER GROUPS

BACKGROUND

Fluorochemicals have been used to provide properties such as hydrophobicity, oleophobicity, and stain resistance to various materials. For example, perfluorinated ether compounds have been used to impart fabrics with these properties. Although the perfluorinated ether compounds have been effective, there is concern that some of these compounds can degrade into lower molecular weight materials or that some of these compounds can contain lower molecular weight compounds that may not eliminate quickly from living organisms.

SUMMARY

Coating compositions are provided that contain an amino resin and a reactive fluorinated copolymer having pendant perfluoropolyether groups as well as pendant groups capable of reacting with the amino resin. It is believed that the perfluoropolyether groups included in the reactive fluorinated copolymer or degradation products of these perfluoropolyether groups can be eliminated effectively from the body of living organisms. The coating compositions can be used to impart hydrophobicity, oleophobicity, soil resistance, stain resistance, repellency, solvent resistance, ease of cleaning, or combinations thereof to a substrate.

One aspect of the invention provides a coating composition that includes a reactive fluorinated copolymer and an amino resin. The reactive fluorinated copolymer has pendant perfluoropolyether groups as well as pendant groups capable of reacting with the amino resin. The reactive fluorinated copolymer is the reaction product of a monomer mixture that contains a perfluoropolyether monomer and a crosslinking monomer. The perfluoropolyether monomer is of Formula I:

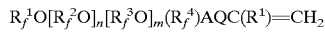

$$R_f^1O[R_f^2O]_n[R_f^3O]_m(R_f^4)AQC(R^1)=CH_2$$

where $R_f^1$ is a perfluoroalkyl having 1 to 10 carbon atoms; $R_f^2$ is a perfluoroalkylene having 1 to 4 carbon atoms; $R_f^3$ is a perfluoroalkylene having 1 to 4 carbon atoms; $R_f^4$ is a perfluoroalkylene having 1 to 4 carbon atoms; A is a carbonyloxy or carbonylimino; Q is a divalent linking group selected from an alkylene, hydroxy substituted alkylene, heteroalkylene, hydroxy substituted heteroalkylene, arylene, hydroxy substituted arylene, carbonyl, carbonyloxy, carbonylimino, oxy, imino, or combinations thereof; $R^1$ is hydrogen or alkyl having 1 to 4 carbon atoms; n is an integer of 2 to 25; m is an integer no less than 0 to 25; and at least 90 weight percent of a perfluoropolyether group $R_f^1O[R_f^2O]_n[R_f^3O]_m(R_f^4)$— has a molecular weight of at least 750 g/mole. The crosslinking monomer is selected from a hydroxy functional monomer, an acid functional monomer, a salt of an acid functional monomer, or combinations thereof.

Other aspects of the invention provide an article and a method of preparing an article having a substrate and a cured composition applied to a major surface of the substrate. The cured composition is the reaction product of a fluorinated reactive fluorinated copolymer and an amino resin.

DETAILED DESCRIPTION

Coating compositions are provided that include an amino resin and a reactive fluorinated copolymer. The reactive fluorinated copolymer has pendant perfluoropolyether groups as well as pendant groups capable of reacting with the amino resin. The pendant perfluoropolyether groups of the reactive fluorinated copolymer have a molecular weight of at least 750 g/mole.

Definitions

As used herein, the terms "a", "an", and "the" are used interchangeably with "at least one" to mean one or more of the elements being described.

As used herein, the term "alkyl" refers to a monovalent radical of an alkane. The alkyl can be linear, branched, cyclic, or combinations thereof and typically contains 1 to 30 carbon atoms. In some embodiments, the alkyl group contains 1 to 20, 1 to 14, 1 to 10, 4 to 10, 4 to 8, 1 to 6, or 1 to 4 carbon atoms. Examples of alkyl groups include, but are not limited to, methyl, ethyl, n-propyl, isopropyl, n-butyl, tert-butyl, isobutyl, n-pentyl, n-hexyl, cyclohexyl, n-octyl, n-heptyl, and ethylhexyl.

As used herein, the term "alkylene" refers to a divalent radical of an alkane. The alkylene can be straight-chained, branched, cyclic, or combinations thereof. The alkylene typically has 1 to 200 carbon atoms. In some embodiments, the alkylene contains 1 to 100, 1 to 80, 1 to 50, 1 to 30, 1 to 20, 1 to 10, 1 to 6, or 1 to 4 carbon atoms. The radical centers of the alkylene can be on the same carbon atom (i.e., an alkylidene) or on different carbon atoms.

As used herein, the term "alkoxycarbonyl" refers to a monovalent group of formula —(CO)OR where R is an alkyl group. An example is ethoxycarbonyl.

As used herein, the term "arylene" refers to a divalent radical of a carbocyclic aromatic compound having one to five rings that are connected, fused, or a combination thereof. In some embodiments, the arylene group has up to 3 rings, up to 2 rings, or one aromatic ring. For example, the arylene group can be phenylene.

As used herein, the term "carbonyl" refers to a divalent group of formula —(CO)— where the carbon atom is connected to the oxygen atom by a double bond.

As used herein, the term "carboxy" refers to a monovalent group of formula —(CO)OH.

As used herein, the term "carbonylimino" refers to a divalent group of formula —(CO)NR$^d$— where R$^d$ is hydrogen or alkyl.

As used herein, the term "carbonyloxy" refers to a divalent group of formula —(CO)O—.

As used herein, the term "fluorocarbonyl" refers to a monovalent group of formula —(CO)F.

As used herein, the term "heteroalkylene" refers to a divalent alkylene having one or more carbon atoms replaced with a sulfur, oxygen, or NR$^d$ where R$^d$ is hydrogen or alkyl. The heteroalkylene can be linear, branched, cyclic, or combinations thereof and can include up to 400 carbon atoms and up to 30 heteroatoms. In some embodiments, the heteroalkylene includes up to 300 carbon atoms, up to 200 carbon atoms, up to 100 carbon atoms, up to 50 carbon atoms, up to 30 carbon atoms, up to 20 carbon atoms, or up to 10 carbon atoms.

As used herein, the term "imino" refers to a divalent group of formula —NR$^d$— where R$^d$ is hydrogen or alkyl.

As used herein, the term "oxy" refers to a divalent group of formula —O—.

As used herein, the term "perfluoroalkyl" refers to an alkyl group that has all the hydrogen atoms replaced with fluorine atoms.

As used herein, the term "perfluoroalkylene" refers to an alkylene group that has all of the hydrogen atoms replaced with fluorine atoms.

As used herein, the term "perfluoropolyether" refers to a monovalent group that is an alkyl having at least two carbon atoms replaced with oxygen atoms and having all of the hydrogen atoms replaced with fluorine atoms. The oxygen atoms are separated by at least one carbon atom.

As used herein, the term "reactive fluorinated copolymer" refers to a copolymer having pendant groups capable of reacting with an amino resin. The pendant groups include a hydroxy, acid group, salt of an acid group, or combinations thereof.

Coating Compositions

The coating compositions include an amino resin and a reactive fluorinated copolymer. The reactive fluorinated copolymer is the reaction product of a monomer mixture that includes a perfluoropolyether monomer and a crosslinking monomer. The crosslinking monomer is selected from a hydroxy functional monomer, an acid functional monomer, a salt of an acid functional monomer, or combinations thereof.

The perfluoropolyether monomer is according to Formula I:

$$R_f^1 O[R_f^2 O]_n [R_f^3 O]_m (R_f^4) AQC(R^1) = CH_2$$

where $R_f^1$ is a perfluoroalkyl having 1 to 10 carbon atoms; $R_f^2$ is a perfluoroalkylene having 1 to 4 carbon atoms; $R_f^3$ is a perfluoroalkylene having 1 to 4 carbon atoms; $R_f^4$ is a perfluoroalkylene having 1 to 4 carbon atoms; A is carbonyloxy or carbonylimino; Q is a divalent linking group selected from an alkylene, hydroxy substituted alkylene, heteroalkylene, hydroxy substituted heteroalkylene, arylene, hydroxy substituted arylene, carbonyl, carbonyloxy, carbonylimino, oxy, imino, or combinations thereof; $R^1$ is hydrogen or alkyl having 1 to 4 carbon atoms; n is an integer of 2 to 25; and m is an integer of 0 to 25. At least 90 weight percent of the perfluoropolyether groups $R_f^1 O[R_f^2 O]_n [R_f^3 O]_m (R_f^4)$— have a molecular weight of at least 750 g/mole.

The group $R_f^1$ in Formula I is a linear or branched perfluoroalkyl having 1 to 10 carbon atoms. In some embodiments, $R_f^1$ has 1 to 6 carbon atoms, 1 to 4 carbon atoms, 2 to 4 carbon atoms, or 3 carbon atoms. Representative $R_f^1$ groups include $CF_3CF_2$—, $CF_3CF_2CF_2$—, $CF_3CF(CF_3)$—, $CF_3CF(CF_3)CF_2$—, $CF_3CF_2CF_2CF_2$—, $CF_3CF_2CF(CF_3)$—, $CF_3CF_2CF(CF_3)CF_2$—, $CF_3CF(CF_3)CF_2CF_2$—, and the like. In some examples, $R_f^1$ is $CF_3CF_2CF_2$—.

The groups $R_f^2$ and $R_f^3$ are each independently a linear or branched perfluoroalkylene group having 1 to 4 carbon atoms. In some embodiments, the perfluoroalkylene group has 1, 2, or 3 carbon atoms. Suitable perfluoroalkylene groups include —$CF_2$—, —$CF(CF_3)$—, —$CF_2CF_2$—, —$CF(CF_3)CF_2$—, —$CF_2CF_2CF_2$—, —$CF(CF_3)CF_2CF_2$—, —$CF_2CF_2CF_2CF_2$—, and —$CF_2C(CF_3)_2$—.

In some perfluoropolyether monomers, m is equal to 0 and there is no —$R_f^3 O$— group in Formula I. That is, the compounds are according to the following formula $$R_f^1 O[R_f^2 O]_n (R_f^4) AQC(R^1) = CH_2$$

where n is an integer of 2 to 25. Suitable examples include, but are not limited to, —$[CF_2CF_2O]_n$— where n is an integer of 4 to 25, —$[CF(CF_3)O]_n$— where n is an integer of 4 to 25, —$[CF(CF_3)CF_2O]_n$— where n is an integer of 3 to 25, —$[CF_2CF_2CF_2O]_n$— where n is an integer of 3 to 25, —$[CF(CF_3)CF_2CF_2O]_n$— where n is an integer of 2 to 25, or —$[CF_2CF_2CF_2CF_2O]_n$— where n is an integer of 2 to 25.

In other perfluoropolyether monomers, m is equal to an integer of 1 to 25 and the $R_f^2$ group is different than the $R_f^3$ group. Exemplary $[R_f^2 O]_n [R_f^3 O]_m$ groups include, but are not limited to, —$[CF_2O]_n[CF_2CF_2O]_m$—, —$[CF_2O]_n[CF(CF_3)CF_2O]_m$—, —$[CF_2O]_n[CF_2CF_2CF_2O]_m$—, —$[CF_2CF_2O]_n[CF_2O]_m$—, —$[CF_2CF_2O]_n[CF(CF_3)CF_2O]_m$—, —$[CF_2CF_2O]_n[CF_2CF_2CF_2O]_m$— where n+m is equal to an integer of at least 4. Other suitable examples include —$[CF_2CF_2CF_2O]_n[CF_2CF(CF_3)O]_m$— and $[CF_2CF_2CF_2O]_n[CF(CF_3)CF_2O]_m$— where n+m is an integer of at least 3.

The group $R_f^4$ in Formula I is a linear or branched perfluoroalkylene having 1 to 4 carbon atoms. In some embodiments, $R_f^4$ has two or three carbon atoms. Exemplary $R_f^4$ groups include —$CF_2$—, —$CF(CF_3)$—, —$CF_2CF_2$—, —$CF_2CF_2CF_2$—, $CF(CF_3)CF_2$—, and the like. The $R_f^4$ group is —$CF(CF_3)$— in some compounds.

In some embodiments, the perfluoropolyether monomer has a perfluoropolyether group of formula $CF_3CF_2CF_2O[CF(CF_3)CF_2O]_n CF(CF_3)$— where n is an integer of 3 to 25. For example, n can be an integer of at least 4, of at least 5, or of at least 6. Exemplary values of n can be up to 25, up to 20, up to 15, up to 10, up to 8, or up to 7. In some monomers, n is an integer of 4 to 20, 5 to 15, 6 to 10, 6 to 9, 6 to 8, or 6 to 7.

The group A in Formula I is a carbonyloxy or carbonylimino. In some embodiments, A is a carbonylimino group. The group Q in Formula I is a divalent linking group selected from an alkylene, hydroxy substituted alkylene, heteroalkylene, hydroxy substituted heteroalkylene, arylene, hydroxy substituted arylene, carbonyl, carbonyloxy, carbonylimino, oxy, imino, or combinations thereof.

Suitable A-Q groups include, but are not limited to, the following where an asterisk indicates the position of attachment of A-Q to the perfluoropolyether group: *—(CO)NR$^a$(CH$_2$)$_u$O(CO)—, *—(CO)O(CH$_2$)$_u$O(CO)—, *—(CO)NR$^a$(CH$_2$)$_u$O(CO)NR$^a$(CO)—, *—(CO)NR$^a$(CH$_2$)$_u$O(CO)NR$^a$(CH$_2$)$_u$O(CO)—, *—(CO)NR$^a$(CH$_2$)$_u$O(CO)NR$^a$(CR$_a^2$)$_u$Ar$^1$—, *—(CO)NR$^a$(CH$_2$)$_u$—, *—(CO)O(CH$_2$)$_u$—, *—(CO)NR$^a$Ar$^1$(CH$_2$)$_u$—, or *—(CO)NR$^a$(C$_k$H$_{2k}$O)$_p$(CO)— that is unsubstituted or substituted with a hydroxy. Each u is independently an integer of 1 to 12; Ar$^1$ is an arylene such as phenylene; each R$^a$ group is independently hydrogen or an alkyl having 1 to 6 carbon atoms; k is an integer of 1 to 3; and p is an integer of 1 to 10. In some examples, R$^a$ is hydrogen, methyl, ethyl, propyl, butyl, or hexyl and u is an integer of 2, 3, 4, 6, 8, 10, or 11.

Specific examples of the group A-Q in Formula I include, but are not limited to, *—(CO)OCH$_2$CH(OH)CH$_2$O(CO)—, *—(CO)NHCH$_2$CH$_2$O(CO)—, *—(CO)NHCH$_2$—, *—(CO)OCH$_2$—, or *—(CO)N(CH$_3$)CH$_2$CH$_2$O(CO)—. In some reactive fluorinated copolymers, the A-Q group is *—(CO)NHCH$_2$CH$_2$O(CO)—.

The group R$^1$ in formula I can be a hydrogen or an alkyl having 1 to 4 carbon atoms. In some examples, R$^1$ is hydrogen or methyl.

Exemplary perfluoropolyether monomers include, but are not limited to, $CF_3CF_2CF_2O[CF(CF_3)CF_2O]_n CF(CF_3)$—(CO)NR$^a$CH$_2$CH$_2$O(CO)—CH=CH$_2$ or $CF_3CF_2CF_2O[CF(CF_3)CF_2O]_n CF(CF_3)$—(CO)NR$^a$CH$_2$CH$_2$O(CO)—C(CH$_3$)=CH$_2$ where n is 3 to 25 and $R^a$ is hydrogen, methyl, ethyl, propyl or butyl.

At least 90 weight percent of the perfluoropolyether groups have a molecular weight of at least 750 g/mole. Typically, the molecular weights of the perfluoropolyether groups are in the range of 750 to 5000 g/mole. In some perfluoropolyether monomers, at least 90 weight percent of the perfluoropolyether groups have a molecular weight in the range of 750 to 3000 g/mole, in the range of 750 to 2500 g/mole, in the range of 750 to 2000 g/mole, or in the range of 750 to 1500 g/mole. The lower molecular weight materials can be removed, for example, using vacuum distillation techniques.

The monomer mixture used to prepare the reactive fluorinated copolymer can contain a plurality of perfluoropolyether monomers. In some embodiments, the monomer mixture contains a plurality of perfluoropolyether monomers and each perfluoropolyether monomer has a perfluoropolyether group with a molecular weight of at least 750 g/mole. In other embodiments, the monomer mixture contains a mixture of perfluoropolyether monomers and at least 90 weight percent of the perfluoropolyether groups have a molecular weight of at least 750 g/mole. For example, at least 93 weight percent, at least 95 weight percent, at least 97 weight percent, at least 98 weight percent, or at least 99 weight percent of the perfluoropolyether groups in the perfluoropolyether monomers have a molecular weight of at least 750 g/mole.

It is believed that the reactive fluorinated copolymers have perfluoropolyether groups that can be eliminated effectively from the body of living organisms. It is also believed that fluorochemical degradation products that may form from the perfluoropolyether groups can be eliminated effectively from the body of living organisms. In particular, it is believed that perfluoropolyether groups having a molecular weight of at least 750 g/mole that are derived from an oligomerization product of hexafluoropropylene oxide or the degradation products of such perfluoropolyether groups can eliminate effectively from the body of living organisms.

The perfluoropolyether portion of the perfluoropolyether monomer can be prepared, for example, by oligomerization of hexafluoropropylene oxide to form a perfluoropolyether terminated with a fluorocarbonyl group. This material can be vacuum distilled to remove perfluoropolyether groups having a molecular weight less than 750 g/mole. The fluorocarbonyl group can be converted to a carboxy or alkoxycarbonyl group. The perfluoropolyether monomer can be prepared, for example, by reacting a carboxy, alkoxycarbonyl, or fluorocarbonyl terminated perfluoropolyether with a reactant capable of introducing the linking group A-Q and the ethylenically unsaturated group. Examples of suitable reactions and reactants are further disclosed in the European patent EP 870 778 and U.S. Pat. No. 3,553,179, the disclosure of which is incorporated herein by reference.

For example, a perfluoropolyether monomer of formula PF—(CO)NHCH$_2$—CH=CH$_2$ where PF is the perfluoropolyether group can be prepared by reacting a carboxy or alkoxycarbonyl terminated perfluorinated polyether with H$_2$NCH$_2$CH=CH$_2$. A perfluoropolyether monomer of formula PF—(CO)NH—C$_6$H$_4$—CH$_2$CH$_2$=CH$_2$ can be prepared by reacting a carboxy or alkoxycarbonyl terminated perfluorinated polyether with H$_2$N—C$_6$H$_4$—CH$_2$CH=CH$_2$. Reaction of a carboxy or alkoxycarbonyl terminated perfluorinated polyether with HOCH$_2$CH$_2$=CH$_2$ produces a perfluoropolyether monomer of formula PF—(CO)OCH$_2$CH=CH$_2$. The perfluoropolyether monomer of formula PF—(CO)NHCH$_2$CH$_2$O(CO)C(CH$_3$)=CH$_2$ can be prepared by first reacting a carboxy or alkoxycarbonyl terminated perfluorinated polyether with ethanolamine to prepare the alcohol terminated PF—(CO)NHCH$_2$CH$_2$OH. The alcohol can then be reacted with methacrylic acid or methacrylic anhydride to prepare the perfluoropolyether monomer. Likewise, the perfluoropolyether monomer of formula PF—(CO)NHCH$_2$CH$_2$O(CO)CH=CH$_2$ can be prepared by first reacting a carboxy or alkoxycarbonyl terminated perfluorinated polyether with ethanolamine to prepare the alcohol terminated PF—(CO)NHCH$_2$CH$_2$OH. The alcohol can then be reacted with acrylic acid or acryloyl chloride to prepare the perfluoropolyether monomer.

The amount of perfluoropolyether monomer in the monomer mixture is typically in the range of 3 to 95 weight percent based on the weight of all the monomers plus any chain transfer agent in the monomer mixture. In some embodiments, the monomer mixture contains at least 5 weight percent, at least 10 weight percent, at least 15 weight percent, at least 20 weight percent, at least 25 weight percent, at least 30 weight percent, at least 40 weight percent, or at least 50 weight percent perfluoropolyether monomer based on the weight of all the monomers plus any chain transfer agent in the monomer mixture. The monomer mixture can contain up to 90 weight percent, up to 85 weight percent, up to 80 weight percent, up to 75 weight percent, or up to 70 weight percent perfluoropolyether monomer based on the weight of all the monomers plus any chain transfer agent in the monomer mixture.

In addition to the perfluoropolyether monomer, the monomer mixture used to prepare the reactive fluorinated copolymer includes a crosslinking monomer. The crosslinking monomer has a group capable of reacting with the amino resin. Suitable crosslinking monomers include a hydroxy functional monomer, an acid functional monomer, a salt of an acid functional monomer, or combinations thereof. In some embodiments, these functional groups also can react with a hardening agent if such a hardening agent is present in the coating composition.

The crosslinking monomer can be present in an amount up to 95 weight percent based on the weight of the all monomers plus any chain transfer agent in the monomer mixture. For example, the monomer mixture can contain up to 90 weight percent, up to 80 weight percent, up to 70 weight percent, up to 60 weight percent, up to 50 weight percent, up to 40 weight percent, or up to 30 weight percent crosslinking monomer based on the weight of all the monomers plus any chain transfer agent in the monomer mixture. The monomer mixture can contain at least 5 weight percent, at least 10 weight percent, at least 20 weight percent, at least 30 weight percent, at least 40 weight percent, or at least 50 weight percent crosslinking monomer based on the weight of all the monomers plus any chain transfer agent in the monomer mixture.

In the preparation of some exemplary reactive fluorinated copolymers, the monomer mixture includes 10 to 90 weight percent perfluoropolyether monomers and 10 to 90 weight percent crosslinking monomers based on the weight of the monomers plus any chain transfer agent in the monomer mixture. In other exemplary reactive fluorinated copolymers, the monomer mixture includes 20 to 80 weight percent perfluoropolyether monomers and 20 to 80 weight percent crosslinking monomers or 50 to 75 weight percent perfluoropolyether monomers and 25 to 50 weight percent crosslinking monomers based on the weight of the monomers plus any chain transfer agent in the monomer mixture.

Exemplary hydroxy functional crosslinking monomers include, but are not limited to, hydroxymethyl acrylamide, hydroxymethyl methacrylamide, 2-hydroxy-3-chloropropyl acrylate, 2-hydroxy-3-chloropropyl methacrylate, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, glycerol acrylate, glycerol diacrylate, glycerol methacrylate, glycerol dimethacrylate, allyl alcohol, hydroxy-containing polyethylene oxide based monomers, and combinations thereof.

Suitable acid functional crosslinking monomers include, but are not limited to, unsaturated carboxylic acids of the following formula:

$$R^2R^3C=C(R^2)(CO)OH$$

where each $R^2$ is independently a hydrogen or a $C_{1-6}$ alkyl and $R^3$ is hydrogen or a $C_{1-6}$ alkyl that is unsubstituted or substituted with a carboxy group. Exemplary acid functional monomers include, but are not limited to, acrylic acid, methacrylic acid, crotonic acid, itaconic acid, maleic acid, fumaric acid, and combinations thereof.

The acid functional crosslinking monomers also can be carboxyalkyl acrylates represented by the following formula:

$$CH_2=C(R^2)(CO)OC_vH_{2v}(CO)OH$$

where $R^2$ is hydrogen or a $C_{1-6}$ alkyl and the subscript v is an integer of 2 to 8. Representative examples include 2-carboxyethylacrylate, 2-carboxyethylmethacrylate, 2-carboxypropyl acrylate, 2-carboxypropyl methacrylate, 5-carboxypentyl acrylate, 5-carboxypentyl methacrylate, and the like.

The acid functional crosslinking monomer can be partially or completely neutralized to form a salt. Suitable salts include those having a cation selected from an alkaline metal ion, an alkaline earth metal ion, an ammonium ion, or an ammonium ion that is substituted with a $C_{1-6}$ alkyl where the alkyl group can be unsubstituted or substituted with a hydroxy. Specific cations include, but are not limited to, potassium ions, sodium ions, lithium ions, calcium ions, magnesium ions, strontium ions, ammonium ions, and tetraalkylammonium ions where the alkyl group is unsubstituted or substituted with a hydroxy (e.g., tetrabutylammonium ions, tetramethyl ammonium ions, or dimethyl hydroxyethyl ammonium ions.)

In some reactive fluorinated copolymers, at least some of the crosslinking monomer is an acid functional monomer or a salt of an acid functional monomer. Copolymers containing these crosslinking monomers tend to be more soluble or dispersible in an aqueous based coating composition compared to copolymers prepared using only hydroxy functional crosslinking monomers.

In coating compositions that include an amino resin that is water soluble, at least some of the crosslinking monomer is typically a hydroxy functional monomer. Such coating compositions result in cured coatings having improved optical clarity compared to cured compositions prepared without any hydroxy functional crosslinking monomers.

The crosslinking monomer in some applications includes a hydroxy functional monomer and an acid functional monomer where the weight percent of the hydroxy functional monomer is greater than the weight percent of the acid functional monomer in the monomer mixture. In other applications, the crosslinking monomer includes a hydroxy functional monomer and a salt of an acid functional monomer where the weight percent of the hydroxy functional monomer is greater than the weight percent of the salt of the acid functional monomer in the monomer mixture. In still other applications, the crosslinking monomer includes a hydroxy functional monomer, an acid functional monomer, and a salt of an acid functional monomer where the weight percent of the hydroxy functional monomer exceeds the weight percent of the sum of the acid functional monomer and the salt of the acid functional monomer in the monomer mixture.

For example, the weight percent of hydroxy functional crosslinking monomer can be at least 1.1 times, at least 1.5 times, at least 2.0 times, at least 2.5 times, or at least 3.0 times the weight percent of the acid functional crosslinking monomer, the salt of an acid functional monomer, or a combination thereof in a monomer mixture.

Other non-fluorinated comonomers can be included in the monomer mixture used to prepare the reactive fluorinated copolymer. For example, the monomer mixture can include a hydrocarbon ester of an α,β-ethylenically unsaturated carboxylic acid such as n-butyl methacrylate or acrylate, isobutyl methacrylate or acrylate, octadecyl methacrylate or acrylate, lauryl methacrylate or acrylate, cyclohexyl methacrylate or acrylate, cyclodecyl methacrylate or acrylate, isobornyl methacrylate or acrylate, phenyl methacrylate or acrylate, benzyl methacrylate or acrylate, adamantyl methacrylate or acrylate, tolyl methacrylate or acrylate, 3,3-dimethylbutyl methacrylate or acrylate, (2,2-dimethyl-1-methyl)propyl methacrylate or acrylate, cyclopentyl methacrylate or acrylate, 2-ethylhexyl methacrylate or acrylate, t-butyl methacrylate or acrylate, cetyl methacrylate or acrylate, stearyl methacrylate or acrylate, behenyl methacrylate or acrylate, isooctyl methacrylate or acrylate, n-octyl methacrylate or acrylate, 4-ethylcyclohexyl methacrylate or acrylate, 2-ethoxyethyl methacrylate or acrylate, tetrahydropyrenyl methacrylate or acrylate, or combinations thereof.

Additional exemplary non-fluorinated comonomers include allyl esters such as allyl acetate and allyl heptanoate; alkylvinyl ethers such as cetylvinyl ether, dodecylvinyl ether, isobutylvinyl ether, ethylvinyl ether, and 2-chloroethylvinyl ether; ethylenically unsaturated nitriles such as acrylonitrile, methacrylonitrile, 2-chloroacrylonitrile, 2-chloromethacrylonitrile, 2-cyanoethyl acrylate or methacrylate; styrene and its derivatives such as vinyltoluene, α-methylstyrene, α-cyanomethylstyrene, divinylbenzene, and N-vinylcarbazole; lower olefinic hydrocarbons such as ethylene, propylene, isobutene, 3-chloro-1-isobutene, butadiene, isoprene, chlorobutadiene, dichlorobutadiene, and 2,5-dimethyl-1,5-hexadiene; methacrylates of a polyethylene glycol, polypropylene glycol, or combinations thereof; a chloride containing monomer such as vinyl chloride or vinylidene chloride; and vinyl esters such as vinyl acetate, vinyl propionate, vinyl isobutyrate, vinyl succinate, vinyl stearate, and divinylcarbonate.

Still other exemplary non-fluorinated comonomers include silicones having a polymerizable group. Suitable materials include, for example, acrylate or methacrylate functional silicones such as those commercially available from Shin-Etsu Chemical Co., Ltd., Tokyo, Japan under the trade designation "X-22-164B".

In some embodiments, the monomer mixture used to prepare the reactive fluorinated copolymer includes another fluorinated monomer in addition to the perfluoropolyether monomer. Fluorinated comonomers include those of the following formula:

$$R_f^5\text{-}Q^1\text{-}C(R^5)=CH_2$$

where $R_f^5$ is a linear, branched, or cyclic perfluoroaliphatic group of 3 to 6 carbon atoms; $R^5$ is hydrogen or an alkyl having 1 to 4 carbon atoms; and $Q^1$ is a non-fluorinated divalent linking group having 1 to 20 carbon atoms selected from the group of alkylene, heteroalkylene, arylene, sulfonyl, sulfonylimino, carbonyl, carbonyloxy, carbonylimino, oxy, imino, or combinations thereof. The group $Q^1$ is usually free of functional groups that interfere with free-radical polymerization reactions.

Exemplary fluorinated comonomers include, but are not limited to $CF_3CF_2CF_2CF_2CH_2CH_2O(CO)CR^5=CH_2$, $CF_3CF_2CF_2CF_2CH_2O(CO)CR^5=CH_2$, $CF_3CF_2CF_2CF_2SO_2N(CH_3)CH_2CH_2O(CO)CR^5=CH_2$, $CF_3CF_2CF_2CF_2SO_2N(C_2H_5)CH_2CH_2O(CO)CR^5=CH_2$, $CF_3CF_2CF_2CF_2SO_2N(CH_3)CH_2CH_2O(CO)CR^5=CH_2$, $C_6F_{13}CH_2O(CO)CR^5=CH_2$, and $C_6F_{13}CH_2CH_2O(CO)CR^5=CH_2$ where $R^5$ is hydrogen or methyl.

The reactive fluorinated copolymer is generally prepared by free radical polymerization. The polymerization reaction is commenced, for example, by forming an initiating free radical from an initiator. Useful initiators include, but are not limited to, azo compounds such as 2,2'-azobisisobutyronitrile (AIBN), azobisvaleronitrile, azobis(2-cyanovaleric acid), and 2,2'-azobis(2-methylpropionamidine)dihydrochloride; hydroperoxides such as cumene hydroperoxide, tert-butyl hydroperoxide, and tert-amyl hydroperoxide; dialkyl peroxides such as di-tert-butyl peroxide and dicumyl peroxide; peroxyesters such as tert-butylperbenzoate and di-tert-butylperoxy phthalate; and diacylperoxides such as benzoyl peroxide and lauroyl peroxide. Other useful initiators include a redox system such as a combination of a persulfate and a bisulfite or a combination of ascorbic acid and hydrogen peroxide. The polymerization reaction can also be initiated by exposing the monomer mixture to actinic radiation such as, for example, ultraviolet radiation.

Various amounts of initiator can be present in the monomer mixture depending on the type and molecular weight of the initiator. The initiator is usually present in an amount of 0.1 to 5 weight percent based on the weight of all the monomers plus any chain transfer agent in the monomer mixture. For example, the initiator can be present in an amount of 0.1 to 3 weight percent, 0.1 to 2 weight percent, or 0.1 to 1 weight percent based on the weight of all the monomers plus any chain transfer agent in the monomer mixture.

The polymerization reaction can be carried out in the presence of a chain transfer agent to tailor the molecular weight, to tailor the properties of the reactive fluorinated copolymer, or a combination thereof. The chain-transfer agent usually functions by terminating the polymerization reaction. The amount of chain-transfer agent used can be in the range of 0.005 to 0.30 equivalents per total moles of monomer (i.e., perfluoropolyether monomer, crosslinking monomer, and other comonomers) in the monomer mixture. In some applications, the amount of chain-transfer agent used can be in the range of 0.01 to 0.30, in the range of 0.005 to 0.25, in the range of 0.01 to 0.25, or in the range of 0.01 to 0.20 equivalents per total moles of monomer in the monomer mixture. The chain transfer agent can have a molecular weight less than 50 g/mole to over 10,000 g/mole (i.e., the chain transfer agent can range in molecular weight from that corresponding to a small molecule such as ethanethiol to that corresponding to a polymeric material).

In some embodiments, the chain-transfer agent includes a thiol compound such as ethanethiol, propanethiol, butanethiol, n-octanethiol, tert-dodecanethiol, 2-mercaptoethyl ether, 2-mercaptoimidazole, and the like. The chain-transfer agent can be a polymeric material such as, for example, mercaptosilicones commercially available from Shin-Etsu Chemical Co., Ltd., Tokyo, Japan under the trade designation "KF-2001". Such chain-transfer agents do not have a functional group that can react with the amino resin. In other embodiments, the chain-transfer agent includes a functional group capable of reacting with the amino resin. Functionalized chain-transfer agents such as 3-thiopropionic acid, 2-mercaptoethanol, mercaptopropyltrimethoxysilane, and mercaptopropanediol can be used to both control the molecular weight of the reactive fluorinated copolymer and to provide an additional crosslinking site.

The copolymerization reaction can be carried out in any suitable solvent for organic free-radical reactions. The monomers can be present in the solvent in any suitable concentration. In some embodiments, the monomers plus any chain transfer agent are present in an amount of 5 to 90 weight percent based on the total weight of the monomer mixture.

Examples of suitable solvents for polymerization reactions include linear, branched, or cyclic aliphatic solvents such as hexane, heptane, and cyclohexane; aromatic solvents such as benzene, toluene, and xylene; ethers such as diethyl ether and diisopropyl ether; esters such as ethyl acetate and butyl acetate; alcohols such as ethanol and isopropanol; ketones such as methyl ethyl ketone and methyl isobutyl ketone; sulfoxides such as dimethylsulfoxide; amides such as N,N-dimethylformamide and N,N-dimethylacetamide; halogenated solvents such as methylchloroform, hydrofluoroethers such as those commercially available from 3M Company, St. Paul, Minn. under the trade designation "HFE-7100" and "HFE-7200", trichloroethylene, trifluoroethylene, and solvents commercially available under the trade designation "FREON" from Dupont Chemical Co., Wilmington, Del.; and combinations thereof.

The polymerization reaction can be carried out at any temperature suitable for a free-radical polymerization process. Temperatures are typically in the range of 25° C. to 200° C. The particular temperature depends on a number of variables such as the solvent and the initiator.

The reactive fluorinated copolymer can be dispersed in water. In some embodiments, the dispersion is stabilized using non-fluorinated surfactants such as non-ionic surfactants, anionic surfactants, cationic surfactants, zwitterionic surfactants, or combinations thereof. Exemplary non-ionic surfactants include polyoxyalkylene surfactants such as polyoxyethylene surfactants commercially available under the trade designations "EMULSOGEN EPN 207" from Clarient, Charlotte, N.C. and "TWEEN 80" from ICI, Bridgewater, N.J. Other non-ionic surfactants include organosilicones such as those commercially available under the trade designation "SILWET L-77" from OSi Specialties, South Charleston, W.Va. Suitable anionic surfactants include sodium lauryl sulfate, sodium dodecyl benzene sulfonate, and the like. Suitable cationic surfactants include, but are not limited to, those commercially available under the trade designation "ARQUAD T-50" and "ETHOQUAD 18-25" from Akzo Nobel Surface Chemistry, Chicago, Ill. Exemplary amphoteric surfactants include lauryl amineoxide and cocamido propyl betaine. The non-fluorinated surfactant is usually present in an amount of 1 to 25 weight percent based on the weight of the reactive fluorinated copolymer. In some applications, the non-fluorinated surfactant is present in an amount of 2 to 10 weight percent based on the weight of the reactive fluorinated copolymer.

Alternatively, the reactive fluorinated copolymer can be dispersed or dissolved in an organic solvent. Suitable organic solvents include alcohols such as isopropanol, methoxypropanol, and tert-butanol; ketones such as isobutyl methyl ketone and methyl ethyl ketone; ethers such as isopropyl ether; esters such as butyl acetate and methoxypropanol acetate; and partially fluorinated solvents such as hydrofluoroethers commercially available under the trade designation "HFE-7100" and "HFE-7200" from 3M.

The other components of the coating composition are typically chosen to be compatible with the dispersion or solution of the reactive fluorinated copolymer. The other components can be chosen to be either dispersed or dissolved. The amount of water or organic solvent in the coating composition can be varied depending, for example, on the desired solids or viscosity level.

The amino resin included in the coating composition is any material in the broad class of materials formed by reaction of formaldehyde with urea, melamine, benzoguanamine, or acetylguanamine. Such compounds are well known and described, for example, in *Kirk-Othmer Enyclopedia of Chemical Technology*, 4th Ed., Volume 2, pages 604–637, John Wiley and Sons, 1992. Representative examples of such materials include, but are not limited to, methylolated melamines such as materials commercially available from Surface Specialties, Inc., Springfield, Mass. under the trade designation "RESIMENE 747"; methylolated benzoguamines; methylolated acetylguanamines; methylolated ureas such as dimethylolurea, dimethylolethyleneurea, teteramethylolacetylene urea, and dimethylolpropyleneurea; dimethylol derivatives of tetrahydro-5-alkyl-S-triazone; glyoxal resins such as dimethyloldihydroxyethyleneurea (DMDHEU) and tetramethylolglycoluril; methylated derivatives of any of the foregoing; and urea resins such as N,N'-bis(methoxymethyl) urea. Methylolacrylamide and methylolmethacrylamide polymers are also included in the class of amino resins.

In some applications, it is preferable to use water insoluble amino resins in aqueous coating compositions because they tend to have a longer shelf-life. Suitable water insoluble methylolated melamines include those commercially available under the trade designation "RESIMENE 747" from Surface Specialties, Inc., Springfield, Mass. Some amino resins that are insoluble in water can be dispersed or dissolved in an aqueous coating composition by addition of a water soluble hardening agent to the coating composition. That is, the hardening agent can be used to improve the compatibility of an otherwise insoluble amino resin with an aqueous coating composition.

Any suitable weight ratio of reactive fluorinated copolymer to amino resin can be used in the coating composition. The weight ratio of the reactive fluorinated copolymer to the amino resin in the coating compositions is typically no greater than 50:50. In some embodiments, the weight ratio of the reactive fluorinated copolymer to the amino resin is no greater than 45:55, no greater than 40:60, no greater than 35:65, no greater then 30:70, no greater than 25:75, no greater than 20:80, no greater than 15:85, no greater than 10:90, no greater than 5:95, no greater than 4:96, or no greater than 3:97.

In some applications where the weight ratio of reactive fluorinated copolymer to the amino resin is no greater than 10:90, any crosslinking monomer can be included in the monomer mixture (i.e., the reactive fluorinated copolymer can have pendant groups selected from a hydroxy group, an acid group, a salt of an acid group, or combinations thereof). For example, in some aqueous based coating compositions such as those with a weight ratio of reactive fluorinated copolymers to amino resin of less than 10:90 or less than 5:95, any crosslinking monomer can be included in the monomer mixture.

In some applications, when the weight ratio of reactive fluorinated copolymer to the amino resin is greater than 10:90 or greater than 15:85, the weight percent of the hydroxy functional monomer is greater than the weight percent of the acid functional monomers, greater than the weight percent of the salt of acid functional monomers, or greater than the weight percent of acid functional monomers plus salts of acid functional monomers in the monomer mixture. For example, in some aqueous based coating compositions such as those with a weight ratio of reactive fluorinated copolymers to amine resin of greater than 10:90, the weight percent of the hydroxy functional monomer is greater than the weight percent of the acid functional monomers, greater than the weight percent of the salt of an acid functional monomer, or greater than the weight percent of any other crosslinking monomers included in the monomer mixture.

The coating composition also can include a hardening agent in addition to the amino resin and the reactive fluorinated copolymer. The hardening agent can be a polymeric material that increases the hardness and/or the abrasion resistance of the cured coating composition by increasing its glass transition temperature, increasing the crosslinking density, or a combination thereof relative to a similar coating composition without a hardening agent. In some applications, the hardening agent increases the glass transition temperature of the cured coating composition to at least 80° C. In some applications, the hardening agent can increase the hardness of the cured coating composition by increasing the crosslinking density by reacting with the amino resin, the reactive fluorinated copolymer, or a combination thereof.

A single hardening agent or a combination of hardening agents can be used in the coating compositions. Generally, the amount of hardening agent is 5 to 80 weight percent based on the combined weight of the amino resin and the reactive fluorinated copolymer. In some applications, the amount of hardening agent is present in an amount up to 70 weight percent, up to 60 weight percent, up to 50 weight percent, up to 40 weight percent, up to 30 weight percent, or up to 20 weight percent based on the weight of the amino resin and the reactive fluorinated copolymer.

In some applications, the weight ratio of the hardening agent to the amino resin is usually at least 10:90, at least 15:85, at least 20:80, at least 30:70, at least 40:60, at last 50:50, or at least 55:45. For example, the weight ratio of the hardening agent to the amino resin can be in the range of 20:80 to 80:20 or in the range of 35:65 to 65:35.

Examples of suitable hardening agents that can increase the glass transition temperature of the cured coating composition include copolymers of alkyl methacrylates (e.g., alkyl methacrylates having a $C_{1-4}$ alkyl group); copolymers of alkyl methacrylates with cycloalkyl acrylates (e.g., cycloalkyl acrylates having a $C_{3-7}$ cycloalkyl group); copolymers of hard vinyl monomers (e.g., styrene and methyl styrene) with functional vinyl monomers (e.g., allyl alcohol); homopolymers of monomers having groups capable of reacting with the amino resin (e.g., acrylic acid, methacrylic acid, itaconic acid, maleic acid, and crotonic acid); and copolymers of functional monomers (i.e., monomers containing groups capable of reacting with an amino resin) and a monomer selected from a monoalkyl esters of itaconic and maleic acid where the alkyl group has up to 8 carbon atoms, methacrylonitrile, acrylamide, methacrylamide, or acrylonitrile.

Examples of hardening agents that function by increasing the crosslinking density of the cured coatings include polyols (such as propanediol, 2,2-dimethylpropanediol, trimethanolpropane, or polyester polyols), epoxy resins, novolac resins, polyamines, diamines such as diaminodiphenylsulfone, and urethane diols.

For an aqueous based coating composition, water soluble hardening agents can be used to disperse or dissolve an amino resin that would otherwise be water insoluble (i.e., the hardening agent improves the compatibility of the amino resin with the aqueous based coating composition). In some applications, the addition of such a hardening agent can improve the optical clarity of the resulting cured coating compared to a cured coating formed in the absence of the hardening agent.

If a more flexible coating is desired, polyester polyol and urethane diol hardening agents can be used alone or in combination with other hardening agents. Relatively small concentrations of a polyester polyol or urethane diol can, at least in some applications, increase the flexibility of the cured coating without sacrificing hardness, improve the adhesion of the cured coating to various polymeric substrates, improve the film-forming properties of the coating composition, or combinations thereof.

Polyester polyols are used in some applications as the hardening agent because they tend to yellow less than some other hardening agents such as, for example, styrene homo- and copolymers. Useful commercially available polyester polyols include those sold under the trade designation "K-FLEX 188" from King Industries of Norwalk, Conn.

In some aqueous based coating compositions, the hardening agent is a urethane diol such as water soluble materials commercially available under the trade designation "K-FLEX UD-350W" from King Industries of Norwalk, Conn. Water soluble urethane diols can often increase the solubility or dispersion of the amino resin in the aqueous based coating composition. That is, water soluble urethane diols can be used to dissolve or disperse an amino resin that would be water insoluble in the absence of the urethane diol.

The cured coating can be prepared by reacting the reactive fluorinated copolymer, amino resin, and other ingredients such as the hardening agent in an aqueous dispersion or in an organic solvent. Suitable reaction conditions are typically from room temperature (i.e., 20° C. to 25° C.) to 200° C. Although the coating compositions can be cured at room temperature or at a temperature less than 80° C., the repellency of the cured composition tends to improve with the use of higher curing temperatures. In some applications, the curing temperature is at least 80° C. or at least 100° C. The coating composition can be coated on a web and dried in an oven. The oven can be equipped with a stream of flowing air or nitrogen. Alternatively, the oven can be operated at a reduced pressure to remove by-products, water, solvents, or combinations thereof.

In other examples, the cured coating can be prepared in an organic solvent with a boiling point higher than that of the by-products formed by the displacement of the hydroxy or alkoxy group of the amino resin (i.e., water or alcohol). Suitable solvents include, but are not limited to, butyl acetate, methyl isobutyl ketone, trifluorotoluene, and the like. Reduced pressure can be used to remove the by-products.

Catalysts can be used to form the cured coating composition. In some applications, acidic catalysts such as p-toluenesulfonic acid are used. The acid catalyst can be a blocked catalyst in which an acid catalyst is coupled with a blocking agent such as an amine that dissociates at an elevated temperature to provide an active catalyst. The use of such blocked acidic catalysts allows the incorporation of the catalyst in the coating composition without premature curing. The coating compositions can have a longer shelf-life with the use of a blocked acidic catalyst (i.e., the coating composition can be prepared and stored for long periods of time at room temperature without curing). Exposing the coating composition to a temperature sufficient to dissociate the catalyst from the blocking agent can commence curing. Examples of suitable blocked catalysts include, but are not limited to, those commercially available from King Industries, Norwalk, Conn. under the trade designations "NACURE" and "K-CURE". The amount of the catalyst can affect the curing temperature.

Another class of acid catalysts are Lewis acids that can be activated with ultraviolet radiation. These catalysts can generate an acid when exposed to ultraviolet radiation. This class can be used, for example, with heat sensitive substrates. Such catalysts include, but are not limited to, those commercially available under the trade designation "UVOX" from Ciba Specialty Chemicals, Tarrytown, N.Y.

The perfluoropolyether moieties in some coating compositions can orient or "bloom" to the surface during the curing process. While not wishing to be bound by theory, it is believed that coatings with at least some orientation of the perfluoropolyether moieties tend to have increased repellency compared to cured coatings without any orientation of the perfluoropolyether moieties. In some applications, coatings that are cured at elevated temperatures (e.g., temperatures of at least 80° C.) exhibit more repellency than coatings cured at lower temperatures such as room temperature.

The hardness of the coating can be enhanced by the addition of fillers such as colloidal silica, alumina, glass particles, or ceramic particles. Usually, such fillers are mixed with the reactive fluorinated copolymer, the amino resin, and other materials in the coating composition before the coating composition is cured. After curing, the coating is a composite material. A coupling agent, such as a silane coupling agent, can be added to the coating composition to enhance adhesion between the filler and the reactive fluorinated copolymer, amino resin, hardening agent, and other organic materials in the coating.

Silane coupling agents are compounds that have at least one hydrolysable silane moiety and at least one polymerizable or reactive moiety. The polymerizable or reactive moiety typically contains either methacrylate, acrylate, allyl, styryl, amino, or epoxy functionalities. The hydrolysable silane moiety is usually an alkoxy silyl (e.g., an ethoxy silyl or methoxy silyl) that can react with hydroxy functional inorganic-containing substrates by a condensation reaction. Such materials are described in E. P. Pleuddeman, *Silane Coupling Agents*, Plenum Press, New York, pp. 20–23 and 97 (1982). The amount of silane coupling agent is typically 3 to 5 weight percent based on the weight of the reactive fluorinated copolymer.

If desired, various other ingredients known for use in coating compositions can be added. For example, pigments or dyes can be added to provide a colored coating. The coating composition can further include, for example, additives such as UV stabilizers, viscosity modifiers, leveling agents, buffering agents, agents to impact fire proofing or antistatic properties, fungicidal agents, optical bleaching agents, sequestering agents, mineral salts, swelling agents, or combinations thereof.

The coating composition can be applied to a substrate using any conventional technique. For example, the coating composition can be brushed, rolled, or sprayed onto a substrate. In other examples, the substrate can be immersed into the coating composition or can be spin-coated with the coating composition. When coating flat substrates, the coatings can be applied using, for example, knife-coating techniques or bar-coating techniques to achieve a uniform coating layer.

The coating composition can be applied to the substrate in any desired thickness. For example, the cured coating can have a thickness on the order of a few micrometers, a thickness that can be sufficient to provide a surface having abrasion resistance and low surface energy. Thicker coatings (e.g., up to about 20 micrometers or more) can be obtained by applying a single layer or successive layers of the coating composition to the substrate. Multiple layers can be applied, for example, by drying a first layer without extensive curing (e.g., at about 60° C.) before the application of a second layer. This procedure can be repeated until the desired coating thickness is obtained. The coating can then be cured at an elevated temperature (e.g., 80° C. to 200° C.).

The cured coatings usually have a receding contact angle with water of at least 90 degrees and a receding contact angle with hexadecane of at least 60 degrees. The cured coatings can exhibit repellency even when low levels of the reactive fluorinated copolymer are included in the coating composition (e.g., coating compositions having a reactive fluorinated copolymer to amino resin ratio of 10:90 or less can form a cured coating that can exhibit repellency).

The cured coatings can be optically clear (i.e., the cured coating can have little or no haziness). The cured coatings can, in some applications, provide a glossy finish to the substrate.

In some embodiments, the soil resistance and stain resistance properties are durable (i.e., the coating is not easily abraded or removed by washing). The cured coatings often have satisfactory abrasion resistance based on ASTM standard D4060. The cured coatings often have satisfactory weathering resistance upon exposure to ASTM standard G-155 Cycle 1 weathering conditions.

The type of substrates that can be coated include both rigid and flexible substrates fabricated from polymeric, glass, metal, wood, or ceramic materials. The substrates can be multilayered or composite materials. The coating compositions can be applied to a wide variety of substrates to impart one or more of the following properties to the surface: hydrophobicity, oleophobicity, solvent resistance, repellency, soil resistance, ease of cleaning, or staining resistance. In some embodiments, the cured coatings can provide a surface that is resistant to food, mildew, and beverage stains while providing a lustrous appearance. The cured coatings can, at least in some embodiments, provide a surface that is resistant to soiling or staining from graffiti.

Representative examples of substrates include lenses used in ophthalmic spectacles, sunglasses, optical instruments, illuminators, watch crystals, and the like; plastic window glazing; signs; decorative surfaces such as wallpaper; flooring such as vinyl flooring, wood flooring, laminated flooring, and composite flooring; counter tops; concrete; interior or exterior walls; medical devices; bathroom and kitchen fixtures, and the like. The coating compositions can be applied as a protective coating on aircraft, boat hulls, and other surfaces exposed to marine environments. The coating compositions can be used in automotive polishes, floor polishes, and automotive topcoats. Additionally, the coating compositions can be applied to flexible substrates such as carpet, paper, nonwoven textiles, woven textiles, and the like.

EXAMPLES

Unless otherwise noted, all solvents and reagents were or can be obtained from Aldrich Chemical Co., Milwaukee, Wis.

GLOSSARY

As used herein:

"AA" refers to acrylic acid;

"BMA" refers to n-butyl methacrylate;

"HEMA" refers to 2-hydroxyethyl methacrylate;

"HFPOA" refers to the acrylic acid ester of an oligomeric hexafluoropropylene oxide alcohol as described in Preparative Example 2;

"HFPOMA" refers to the methacrylic acid ester of an oligomeric hexafluoropropylene oxide alcohol as described in Preparative Example 3.

"KF-2001" refers to a mercaptosilicone available from Shin-Etsu Chemical Co., Ltd., Tokyo, Japan that has a molecular weight of about 8000 g/mole and that contains about 4 mole percent mercaptan (i.e., the SH equivalent weight is about 2000 g/mole);

"MAA" refers to methacrylic acid;

"MeFBSEMA" refers to the methacrylic acid ester of N-(2-hydroxyethyl)-N-methylnonafluorobutane-sulfonamide, which can be prepared by the method described in U.S. Pat. No. 2,803,615, incorporated herein by reference;

"NACURE 2558" refers to a solution of a blocked acid catalyst, available from King Industries Inc., Norwalk, Conn.;

"NORBLOC" refers to NORBLOC 7966, an acrylate functional UV stabilizer available from Ciba Specialty Chemicals, Tarrytown, N.Y.;

"PEGMA" refers to poly(ethylene glycol) methacrylate having a number average molecular weight of approximately 526 g/mole;

"RESIMENE 747" refers to a methylated melamine-formaldehyde copolymer, available from Surface Specialties, Inc., Springfield, Mass.;

"SILWET L-77" refers to a non-ionic surfactant available from OSi Specialties, South Charleston, W.Va.;

"SIMAC" refers to a methacryl modified silicone that is available from Shin-Etsu Chemical Co., Ltd., Tokyo, Japan under the trade designation X-22-164B;

"UD350W" refers to K-FLEX UD-350W, an aqueous mixture of urethane diols, which was obtained from King Industries Inc., Norwalk, Conn.;

"VAZO 64" refers to 2,2'-azobis(isobutyronitrile) and is available from Dupont Chemical Co., Wilmington, Del.;

"VAZO 67" refers to 2,2'-azobis(2-methylbutyronitrile) and is available from Dupont Chemical Co., Wilmington, Del.;

Methods

Advancing and receding contact angles of deionized water and hexadecane were measured in air at room temperature using a Model 100 goniometer (available from Rame-Hart, Inc., Mountain Lakes, N.J.

Preparative Example 1

Preparation of
F[CF(CF$_3$)CF$_2$O]$_{6.3}$CF(CF$_3$)C(O)N(H)CH$_2$CH$_2$OH

A mixture of hexafluoropropylene oxide oligomers with terminal fluorocarbonyl groups, which can be prepared as generally described in U.S. Pat. No. 3,350,808 (the disclosure of which is incorporated by reference), can be fractionally vacuum distilled using a silver-coated vacuum jacketed column (available from Ace Glass, Inc., Vineland, N.J.) packed with distillation packing (available under the trade designation "PRO-PAK" from Ace Glass, Inc., Vineland, N.J.) and fitted with an automatic reflux control distilling head (available from Ace Glass, Inc., Vineland, N.J.) and a receiving flask that is cooled in a dry ice-acetone bath. The column can be equilibrated for approximately one hour at reflux before the distillate is removed. Distillation of the lower boiling components can be continued until the material that remains has the indicated stoichiometry as determined by gas phase chromatography. The material that remains after distillation can be reacted with ethanolamine to form the alcohol with the formula F[CF(CF$_3$)CF$_2$O]$_{6.3}$CF(CF$_3$)C(O)N(H)CH$_2$CH$_2$OH as generally described in U.S. Pat. No. 3,274,244, the disclosure of which is incorporated by reference.

Preparative Example 2

Preparation of HFPOA F[CF(CF$_3$)CF$_2$O]$_{6.3}$CF(CF$_3$)C(O)N(H)CH$_2$CH$_2$OC(O)CH=CH$_2$ The alcohol product of Preparative Example 1 (600 g) was combined with ethyl acetate (600 g) and triethylamine (57.9 g) in a 3-neck round bottom flask that was fitted with a mechanical stirrer, a reflux condenser, an addition funnel, and a hose adapter that was connected to a source of nitrogen gas. The mixture was stirred under a nitrogen atmosphere and was heated to 40° C. Acryloyl chloride (51.75 g) was added to the flask dropwise from the addition funnel over about 30 minutes. The mixture was stirred at 40° C. overnight. The mixture was then allowed to cool to room temperature and the mixture was washed twice with 300 mL of 2N aqueous HCl in a separatory funnel and then with 5 weight percent aqueous NaHCO$_3$. The organic phase was dried over MgSO$_4$ and was then filtered. Removal of the volatile components using a rotary evaporator afforded the product.

Preparative Example 3

Preparation of HFPOMA F[CF(CF$_3$)CF$_2$O]$_{6.3}$CF(CF$_3$)C(O)N(H)CH$_2$CH$_2$OC(O)C(CH$_3$)=CH$_2$ The alcohol product of Preparative Example 1 (1035 g) was combined in a 5000 mL flask (fitted with a mechanical stirrer, a digital thermometer, and a hose adapter connected to a source of nitrogen gas) with a solution of 4-methoxyphenol (0.5 g) in methyl tert-butyl ether (5 mL), methacrylic anhydride (158 g), and concentrated sulfuric acid (approximately 10 drops). The mixture was stirred overnight at room temperature. The mixture was then washed once with deionized water (1000 mL) and then methyl tert-butyl ether (250 mL) was added. This organic phase was washed once with 10 weight percent aqueous NaHCO$_3$ (1000 mL). A solution of 4-methoxyphenol (0.5 g) in methyl tert-butyl ether (5 mL) was added to the organic phase and the volatile components were then removed using a rotary evaporator to afford the product.

Preparative Example 4

Preparation of Stock Crosslinker Solution

To magnetically stirred deionized water in a beaker there was added UD-350W (97 g of an aqueous dispersion with 88 weight percent solids). After approximately 2 minutes, RESIMENE 747 (104 g of a solution with 98 weight percent solids) was added, followed by NACURE 2558 (36.7 g of a solution with 25 weight percent solids) and SILWET L-77 (3 g). The mixture was then stirred for approximately 10 minutes to provide the stock crosslinker solution, which had a total solids concentration of 30 weight percent.

Example 1

Preparation of Copolymer HFPOA/MeFBSEMA/MAA/HEMA

A 125 mL screw-cap glass bottle was charged with MeFBSEMA (6 g), the acrylic acid ester of Preparative Example 2 (6 g), MAA (2 g), HEMA (5.4 g), 2-mercaptoethanol (0.6 g), isopropyl alcohol (46.7 g), and VAZO 67 (0.14 g). The mixture was purged with nitrogen gas for 1 minute, after which time the bottle was sealed with a cap. The bottle was placed in a LAUNDER-O-METER (available from Atlas Electric Devices Co., Chicago, Ill.) and left overnight with the water bath temperature set at 60° C. The mixture was then transferred to a round bottom flask and N,N-dimethylaminoethanol (2.48 g) was added. The mixture was magnetically stirred and heated to 65° C. as deionized water (46.7 g) was slowly added to the flask. The more volatile components were removed using a rotary evaporator with the water bath set to 55° C. to afford 68 g of aqueous product solution.

Example 2

Preparation of Copolymer HFPOA/MeFBSEMA/MAA/HEMA

A 500 mL round bottom flask, fitted with a heating mantle, a magnetic stir bar, a reflux condenser, and a hose adapter connected to a source of nitrogen gas, was charged with the acrylic acid ester product of Preparative Example 2 (30 g), MAA (5 g), HEMA (13.5 g), 2-mercaptoethanol (1.5 g), isopropyl alcohol (116.7 g), and VAZO 67 (0.35 g). The flask was evacuated using a water aspirator and refilled with nitrogen gas. This process was repeated two more times. The mixture was then stirred under a nitrogen atmosphere and heated at 65° C. overnight. N,N-dimethylaminoethanol (5.33 g) and then deionized water (116.7 g) were sequentially added to the flask. The more volatile components were removed using a rotary evaporator with the water bath set to 55° C. to afford 141 g of aqueous product solution.

Example 3

Preparation of a Silicone-Containing Copolymer of HFPO Methacrylate

A 500 mL round bottom flask, fitted with a heating mantle, a magnetic stir bar, a reflux condenser, and a hose adapter connected to a source of nitrogen gas, was charged with the following monomers in weight ratios as indicated: HFPOMA as prepared in Preparative Example 3 (30.9 weight percent), MAA (10.3 weight percent), and HEMA (27.8 weight percent). The mercaptosilicone KF-2001 was then added in a quantity sufficient to provide a concentration of KF-2001 equal to 30.9 weight percent of the monomer and mercaptosilicone mixture. Isopropyl alcohol was added in a quantity sufficient to provide a concentration of dissolved species of 24.4 weight percent. VAZO 67 was then added in a quantity sufficient to provide a mixture that was 1 weight percent VAZO 67 based on the total monomer and mercaptosilicone weight. The flask was evacuated using a water aspirator and was refilled with nitrogen gas. This process was repeated two more times. The mixture was then stirred under a nitrogen atmosphere and heated at 65° C. overnight. To this mixture, N,N-dimethylaminoethanol, in an amount that was equimolar to the amount of MAA in the mixture, was added in one portion. The mixture was stirred for 15 minutes, after which time deionized water, in an amount equal in weight to the weight of isopropyl alcohol, was slowly added to the flask. The more volatile components were removed using a rotary evaporator with the water bath set to 50° C. to afford the aqueous product solution.

Examples 4–5

Preparation of Silicone-Containing Copolymers of HFPO Methacrylate

For each of Examples 4–5, a 500 mL round bottom flask, fitted with a heating mantle, a magnetic stir bar, a reflux condenser, and a hose adapter connected to a source of nitrogen gas, was charged with the monomers in the weight ratios as given in Table 1. The weight percents are calculated based on the weight of the monomers and the chain transfer agent (2-mercaptoethanol) in the monomer mixture. 2-Mercaptoethanol was then added in a quantity sufficient to provide a concentration of 2-mercaptoethanol equal to 3 weight percent of the monomer mixture (i.e., based on the amount present in the sum of the monomers and the chain transfer agent in the monomer mixture). Isopropyl alcohol was added in a quantity sufficient to provide a total monomer concentration of 24.4 wt %. VAZO 67 was then added in a quantity sufficient to provide a mixture that was 1 weight percent VAZO 67 based on the total monomer weight. Each flask was evacuated using a water aspirator and was refilled with nitrogen gas. This process was repeated two more times. Each mixture was then stirred under a nitrogen atmosphere and heated at 65° C. overnight. To each mixture, N,N-dimethylaminoethanol, in an amount that was equimolar to the amount of MAA in the mixture, was added in one portion. Each mixture was stirred for 15 minutes, after which time deionized water, in an amount equal in weight to the weight of isopropyl alcohol, was slowly added to the flask of each Example. The more volatile components were removed using a rotary evaporator with the water bath set to 50° C. to afford the aqueous product solutions. The compositions are given in Table 1.

TABLE 1

| | Examples 4–5 | | | |
|---|---|---|---|---|
| | Monomer | | | |
| Example | A (wt %) | B (wt %) | C (wt %) | D (wt %) |
| 4 | HFPOMA (50) | MAA (10) | HEMA (27) | SIMAC (10) |
| 5 | HFPOMA (27) | MAA (30) | HEMA (10) | SIMAC (30) |

Examples 6–18

Preparation of HFPO Monomer-Containing Copolymers

For each of Examples 6–18, a 500 mL round bottom flask, fitted with a heating mantle, a magnetic stir bar, a reflux condenser, and a hose adapter connected to a source of nitrogen gas, was charged with the monomers in the weight ratios as given in Table 2. 2-Mercaptoethanol was then added in a quantity sufficient to provide a concentration of 2-mercaptoethanol equal to 3 weight percent based on the weight of the monomers plus the chain transfer agent in the monomer mixture. Isopropyl alcohol was added in a quantity sufficient to provide a total monomer concentration of 24.4 wt %. VAZO 64 was then added in a quantity sufficient to provide a mixture that was 1 weight percent VAZO 64 based on the total monomer weight. Each flask was evacuated using a water aspirator and was refilled with nitrogen gas. This process was repeated two more times. Each mixture was then stirred under a nitrogen atmosphere and heated at 65° C. overnight. To each mixture except that of Example 11, N,N-dimethylaminoethanol, in an amount that was equimolar to the amount of MAA or AA in the mixture, was added in one portion. Each mixture was stirred for 15 minutes, after which time deionized water, in an amount equal in weight to the weight of isopropyl alcohol, was slowly added to the flask of each Example. The more volatile components were removed using a rotary evaporator with the water bath set to 50° C. to afford the aqueous product solutions. The coating compositions are given in Table 2, wherein "N/A" means that the given component was not included in the mixture. The monomer concentration was based on the total weight of monomers and chain transfer agent in the monomer mixture.

TABLE 2

| | Examples 6–18 | | | |
|---|---|---|---|---|
| Ex- | Monomer | | | |
| ample | A (wt %) | B (wt %) | C (wt %) | D (wt %) |
| 6 | HFPOMA (33.3) | MAA (33.3) | HEMA (33.3) | N/A |
| 7 | HFPOMA (66.7) | MAA (16.7) | HEMA (16.7) | N/A |
| 8 | HFPOMA (16.7) | MAA (16.7) | HEMA (66.7) | N/A |
| 9 | HFPOMA (16.7) | MAA (66.7) | HEMA (16.7) | N/A |
| 10 | HFPOMA (50) | MAA (50) | N/A | N/A |
| 11 | HFPOMA (50) | HEMA (50) | N/A | N/A |
| 12 | HFPOMA (5) | MAA 47.5) | HEMA 47.5) | N/A |
| 13 | HFPOMA (61.9) | MAA (10.3) | HEMA (27.8) | N/A |
| 14 | HFPOMA (30.9) | MAA (10.3) | HEMA (27.8) | MeFBSEMA (30.9) |
| 15 | HFPOMA (61.9) | AA (10.3) | HEMA (27.8) | N/A |
| 16 | HFPOA (41.2) | MAA (10.3) | HEMA (27.8) | BMA (20.6) |
| 17 | HFPOA (41.2) | MAA (10.3) | HEMA 27.8) | PEGMA (20.6) |
| 18 | HFPOA (59.8) | MAA (10.3) | HEMA (27.8) | NORBLOC (2.1) |

Examples 19–33

Cured Coatings of HFPO-Containing Copolymers

Each of the aqueous copolymer solution products of Examples 1–18 was combined with the stock crosslinker solution of Preparative Example 3, in weight ratios based on total solid concentrations of each of the copolymer solution and the stock crosslinker solution, as indicated in Table 3.

Each resultant solution was coated onto polyester film that had a thickness of 2 mm, using a #4 Meyer coating rod. Each coating was dried using a forced air oven for 3 minutes at 145–150° C. The coating composition of each coating and the advancing and receding contact angles of water and hexadecane are given in Table 3.

TABLE 3

Examples 19–33

| Example | HFPO Copolymer from Example No. | Weight Ratio HFPO Copolymer/ Crosslinker | Water Contact Angle (advancing/ receding) | Hexadecane Contact Angle (advancing/ receding) |
|---|---|---|---|---|
| 19 | 6 | 10/90 | 109°/88° | 64°/58° |
| 20 | 7 | 10/90 | 117°/97° | 69°/62° |
| 21 | 8 | 10/90 | 109°84° | 63°/60° |
| 22 | 9 | 10/90 | 106°/72° | 58°/52° |
| 23 | 10 | 10/90 | 109°/70° | 67°/56° |
| 24 | 11 | 10/90 | 119°/94° | 68°/63° |
| 25 | 12 | 10/90 | 102°/61° | 51°/43° |
| 26 | 6 | 25/75 | 111°/86° | 59°/50° |
| 27 | 7 | 25/75 | 119°/91° | 68°/57° |
| 28 | 8 | 25/75 | 111°/81° | 64°/58° |
| 29 | 9 | 25/75 | 109°/72° | 59°/53° |
| 30 | 10 | 25/75 | 111°/75° | 65°/56° |
| 31 | 11 | 25/75 | 107°/70° | 66°/60° |
| 32 | 12 | 25/75 | 108°/75° | 58°/54° |
| 33 | 6 | 45/55 | 110°/85° | 65°/58° |
| 34 | 7 | 45/55 | 114°/84° | 69°/62° |
| 35 | 8 | 45/55 | 109°/78° | 63°/55° |
| 36 | 9 | 45/55 | 108°/62° | 61°/54° |
| 37 | 10 | 45/55 | 120°/78° | 72°/64° |
| 38 | 11 | 45/55 | 119°/98° | 69°/60° |
| 39 | 12 | 45/55 | 107°/75° | 57°/48° |
| 40 | 13 | 3/97 | 118°/76° | 70°/65° |
| 41 | 6 | 3/97 | 106°/77° | 65°/57° |
| 42 | 7 | 3/97 | 114°/89° | 70°/65° |
| 43 | 8 | 3/97 | 109°/76° | 65°/54° |
| 44 | 9 | 3/97 | 102°/73° | 66°/53° |
| 45 | 16 | 3/97 | 110°/68° | 6°/61° |
| 46 | 17 | 3/97 | 117°/90° | 6°/62° |
| 47 | 3 | 3/97 | 110°/90° | 54°/48° |
| 48 | 11 | 3/97 | 107°/59° | 67°/61° |
| 49 | 1 | 3/97 | 120°/93° | 67°/62° |
| 50 | 13 | 3/97 | 120°/93° | 67°/60° |
| 51 | 4 | 3/97 | 119°/96° | 64°/57° |
| 52 | 5 | 3/97 | 115°/89° | 66°/61° |
| 53 | 15 | 3/97 | 119°/97° | 69°/62° |
| 54 | 12 | 3/97 | 95°/59° | 38/30 |
| 55 | 10 | 3/97 | 115°/80° | 65°/59° |

Examples 56–91

Surface Abrasion Resistance of Coatings of Cured HFPO-Containing Copolymers

Each of the coatings of Examples 16–36 were tested for abrasion resistance by observing the repellency of ink from a permanent black marking pen (available under the trade designation "SHARPIE" from Sanford, Bellwood, Ill.) on the surface of the coating before and after a fixed number of abrasion cycles that were carried out according to ASTM Standard D4060-01 (2001 version). Each coating was evaluated for ink repellency by observing a continuous line of the ink as applied from the marking pen across adjacent portions of the coating that were abraded and portions that were not abraded. A rating of "A" indicates that the ink did not form a continuous film on the surface of the abraded portion of the coating, whereas a rating of "B" indicates that the ink formed a continuous film on the coating. The data are given in Table 3. In Table 3, "N/A" means that the test was not conducted.

TABLE 3

Examples 56–91

| Example | Coating From Example No. | 25 Cycles | 50 Cycles | 100 Cycles |
|---|---|---|---|---|
| 56 | 19 | A | B | N/A |
| 57 | 20 | A | B | N/A |
| 58 | 21 | A | A | B |
| 59 | 22 | A | B | N/A |
| 60 | 23 | A | B | N/A |
| 61 | 24 | A | B | N/A |
| 62 | 25 | B | N/A | N/A |
| 63 | 26 | A | B | N/A |
| 64 | 27 | B | N/A | N/A |
| 65 | 28 | B | N/A | N/A |
| 66 | 29 | B | N/A | N/A |
| 67 | 30 | B | N/A | N/A |
| 68 | 31 | A | B | N/A |
| 69 | 32 | B | N/A | N/A |
| 70 | 33 | A | B | N/A |
| 71 | 34 | B | N/A | N/A |
| 72 | 35 | A | A | B |
| 73 | 36 | B | N/A | N/A |
| 74 | 37 | B | N/A | N/A |
| 75 | 38 | A | A | B |
| 76 | 39 | A | A | B |
| 77 | 40 | A | B | B |
| 78 | 41 | A | B | B |
| 79 | 42 | A | B | B |
| 80 | 43 | A | B | B |
| 81 | 44 | A | B | B |
| 82 | 45 | A | B | B |
| 83 | 46 | A | A | B |
| 84 | 47 | A | B | B |
| 85 | 48 | A | B | B |
| 86 | 49 | A | B | B |
| 87 | 50 | A | A | B |
| 88 | 51 | A | A | B |
| 89 | 52 | A | B | B |
| 90 | 53 | A | A | A |
| 91 | 54 | B | B | B |
| 92 | 55 | A | B | B |

Examples 93–108

Weathering Resistance of Coatings of Cured HFPO-Containing Copolymers

Each of the coatings of Examples 40–55 were tested for weathering resistance by observing the repellency of ink from a permanent black marking pen (available under the trade designation "SHARPIE" from Sanford, Bellwood, Ill.) on the surface of the coating after fixed lengths of time, as indicated in Table 4, of exposure to weathering conditions according to ASTM Standard G-155-00a Cycle 1 (2000 version). Each coating was evaluated for ink repellency by observing a continuous line of the ink as applied from the marking pen across portions of the coating that were abraded and portions that were not abraded. Marking pen ink repellency was also evaluated before each sample was exposed to the weathering conditions. A rating of "3" indicates that the ink formed a narrow discontinuous film on the surface of the exposed coating, a rating of "2" indicates that the ink formed a wider discontinuous film on the surface of the exposed coating, a rating of "1" indicates that the ink formed a partially continuous film on the surface of the exposed coating, and a rating of "0" indicates that the ink formed a continuous film on the surface of the coating. The data are given in Table 4. In Table 4, "N/A" means that the weathering test was not conducted for the indicated length of time.

TABLE 4

Examples 93–108

| Example | Coating From Example No. | Time of Exposure to Weathering Conditions | | |
|---|---|---|---|---|
| | | 0 hours | 161 hours | 353 hours |
| 93 | 40 | 3 | 3 | 1 |
| 94 | 41 | 3 | 0 | N/A |
| 95 | 42 | 3 | 2 | 1 |
| 96 | 43 | 3 | 2 | 0 |
| 97 | 44 | 3 | 0 | N/A |
| 98 | 45 | 3 | 3 | 1 |
| 99 | 46 | 3 | 3 | 0 |
| 100 | 47 | 3 | 3 | 1 |
| 101 | 48 | 3 | 3 | N/A |
| 102 | 49 | 3 | 3 | 1 |
| 103 | 50 | 3 | 3 | 1 |
| 104 | 51 | 3 | 0 | 1 |
| 105 | 52 | 3 | 3 | N/A |
| 106 | 53 | 3 | 3 | 1 |
| 107 | 54 | 1 | 0 | N/A |
| 108 | 55 | 3 | 0 | N/A |

What is claimed is:

1. A coating composition comprising (1) a reactive fluorinated copolymer and (2) an amino resin in a weight ratio of reactive fluorinated copolymer to amino resin of less than 5:95, said amino resin comprising the reaction product of formaldehyde with urea, melamine, benzoguanamine, or acetylguanamine, said reactive fluorinated copolymer having pendant perfluoropolyether groups and pendant groups capable of reacting with the amino resin, wherein said reactive fluorinated copolymer is the reaction product of a monomer mixture comprising (a) a perfluoropolyether monomer of Formula I:

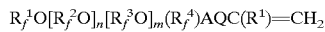

wherein $R_f^1$ is a perfluoroalkyl having 1 to 10 carbon atoms;
$R_f^2$ is a perfluoroalkylene having 1 to 4 carbon atoms;
$R_f^3$ is a perfluoroalkylene having 1 to 4 carbon atoms;
$R_f^4$ is a perfluoroalkylene having 1 to 4 carbon atoms;
A is a carbonyloxy or carbonylimino;
Q is a divalent linking group selected from an alkylene, hydroxy substituted alkylene, heteroalkylene, hydroxy substituted heteroalkylene, arylene, hydroxy substituted arylene, carbonyl, carbonyloxy, carbonylimino, oxy, imino, or combinations thereof;
$R^1$ is hydrogen or alkyl having 1 to 4 carbon atoms;
n is an integer of 2 to 25;
m is an integer no less than 0 to 25; and
at least 90 weight percent of a perfluoropolyether group $R_f^1O[R_f^2O]_n[R_f^3O]_m(R_f^4)$— has a molecular weight of at least 750 g/mole; and (b) a crosslinking monomer in an amount of at least 5 weight percent based on the weight of the monomer mixture, wherein the crosslinking monomer comprises a hydroxy functional monomer, an optional acid functional monomer, an optional salt of an acid functional monomer, or combinations thereof, wherein the weight percent of the hydroxy functional monomer exceeds the sum of the weight percent of the optional said functional monomer and the weight percent of the optional salt of the acid functional monomer.

2. The coating composition of claim 1, wherein $R_f^1$ is selected from $CF_3CF_2$—, $CF_3CF_2CF_2$—, $CF_3CF(CF_3)$—, $CF_3CF(CF_3)CF_2$—, $CF_3CF_2CF_2CF_2$—, $CF_3CF_2CF(CF_3)$—, $CF_3CF_2CF(CF_3)CF_2$—, or $CF_3CF(CF_3)CF_2CF_2$—.

3. The coating composition of claim 1, wherein $R_f^1$— is $CF_3CF_2CF_2$— or $CF_3CF(CF_3)$—.

4. The coating composition of claim 1, wherein $R_f^2$ and $R_f^3$ are independently selected from the group —$CF_2$—, —$CF(CF_3)$—, —$CF_2CF_2$—, —$CF(CF_3)CF_2$—, —$CF_2CF_2CF_2$—, —$CF(CF_3)CF_2CF_2$—, —$CF_2CF_2CF_2CF_2$—, or —$CF_2C(CF_3)_2$—.

5. The coating compositions of claim 1, wherein m is equal to 0 and $R_f^2$ is —$CF(CF_3)CF_2$— or —$CF_2CF_2CF_2$—.

6. The coating composition of claim 1, wherein $R_f^4$ is —$CF_2$—, —$CF(CF_3)$—, —$CF_2CF_2$—, —$CF_2CF_2CF_2$—, or —$CF(CF_3)CF_2$—.

7. The coating composition of claim 1, wherein $R^1$ is selected from hydrogen or methyl.

8. The coating composition of claim 1, wherein A is a carbonylimino.

9. The coating composition of claim 1, wherein AQ is selected from *—(CO)NR$^a$(CH$_2$)$_u$O(CO)—, *—(CO)O(CH$_2$)$_u$O(CO)—, *—(CO)NR$^a$(CH$_2$)$_u$O(CO)NR$^a$(CO)—, *—(CO)NR$^a$(CH$_2$)$_u$O(CO)NR$^a$(CH$_2$)$_u$O(CO)—, *—(CO)NR$^a$(CH$_2$)$_u$O(CO)NR$^a$(CR$_a^2$)$_u$Ar$^1$—, *—(CO)NR$^a$(CH$_2$)$_u$—, *—(CO)O(CH$_2$)$_u$—, *—(CO)NR$^a$Ar$^1$(CH$_2$)$_u$—, or *—(CO)NR$^a$(C$_k$H$_{2k}$O)$_p$(CO)— that is unsubstituted or substituted with a hydroxy, wherein
each u is independently an integer of 1 to 12;
Ar$^1$ is an arylene;
each R$^a$ group is independently hydrogen or an alkyl having 1 to 6 carbon atoms;
k is an integer of 1 to 3;
and p is an integer of 1 to 10.

10. The coating composition of claim 1, wherein the perfluoropolyether monomer is selected from CF$_3$CF$_2$CF$_2$O[CF(CF$_3$)CF$_2$O]$_n$CF(CF$_3$)—(CO)NR$^a$CH$_2$CH$_2$O(CO)—CH=CH$_2$ or CF$_3$CF$_2$CF$_2$O[CF(CF$_3$)CF$_2$O]$_n$CF(CF$_3$)—(CO)NR$^a$CH$_2$CH$_2$O(CO)—C(CH$_3$)=CH$_2$ wherein
n is 3 to 25; and
R$^a$ is hydrogen, methyl, ethyl, propyl or butyl.

11. The coating composition of claim 1, wherein the acid functional monomer comprises a compound of formula

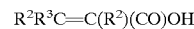

or a salt thereof, wherein
each R$^2$ is independently a hydrogen or a C$_{1-6}$ alkyl; and
R$^3$ is hydrogen or a C$_{1-6}$ alkyl that is unsubstituted or substituted with a carboxy group.

12. The coating composition of claim 1, wherein the acid functional monomer comprises acrylic acid, methacrylic acid, or a salt thereof.

13. The coating composition of claim 1, wherein the hydroxy functional monomer is selected from hydroxymethyl acrylamide, hydroxymethyl methacrylamide, 2-hydroxy-3-chloropropyl acrylate, 2-hydroxy-3-chloropropyl methacrylate, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, glycerol acrylate, glycerol diacrylate, glycerol methacrylate, glycerol dimethacrylate, ally alcohol, hydroxy-containing polyethylene oxide based monomer, or combinations thereof.

14. The coating composition of claim 1, wherein the amino resin is selected from a methylolated melamine, methylolated urea, methylolated benzoguanamine, or methylolated acetoguanamine.

15. The coating composition of claim 1, further comprising a hardening agent.

16. The coating composition of claim 15, wherein the hardening agent is water soluble and the hardening agent increases the solubility of the amino resin in the coating composition.

17. A coating composition comprising (1) a reactive fluorinated copolymer and (2) an amino resin, said coating composition being free of a hardening agent, said amino resin comprising the reaction product of formaldehyde with urea, melamine, benzoguanamine, or acetylguanamine, said reactive fluorinated copolymer having pendant perfluoropolyather groups and pendant groups capable of reacting with the amino resin, wherein said reactive fluorinated copolymer is the reaction product of a monomer mixture comprising (a) a perfluoropolyether monomer of Formula I:

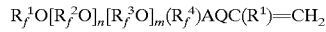

wherein $R_f^1$ is a perfluoroalkyl having 1 to 10 carbon atoms;
$R_f^2$ is a perfluoroalkylene having 1 to 4 carbon atoms;
$R_f^3$ is a perfluoroalkylene having 1 to 4 carbon atoms;
$R_f^4$ is a perfluoroalkylene having 1 to 4 carbon atoms;
A is a carbonyloxy or carbonylimino;
Q is a divalent linking group selected from an alkylene, hydroxy substituted alkylene, heteroalkylene, hydroxy substituted heteroalkylene, arylene, hydroxy substituted arylene, carbonyl, carbonyloxy, carbonylimino, oxy, imino, or combinations thereof;
$R^1$ is hydrogen or alkyl having 1 to 4 carbon atoms;
n is an integer of 2 to 25;
m is an integer no less than 0 to 25; and
at least 90 weight percent of a perfluoropolyether group $R_f^1O[R_f^2O]_n[R_f^3O]_m(R_f^4)$— has a molecular weight of at least 750 g/mole; and (b) a crosslinking monomer in an amount of at least 5 weight percent based on the weight of the monomer mixture, wherein the crosslinking monomer comprises a hydroxy functional monomer, an optional acid functional monomer, an optional salt of an acid functional monomer, or combinations thereof, wherein the weight percent of the hydroxy functional monomer exceeds the weight percent of the sum of the sum of the optional acid functional monomer and the weight of the optional salt of the acid functional monomer.

* * * * *

UNITED STATES PATENT AND TRADEMARK OFFICE
CERTIFICATE OF CORRECTION

PATENT NO. : 6,995,222 B2  
APPLICATION NO. : 10/738185  
DATED : February 7, 2006  
INVENTOR(S) : Buckanin, Richard S.

Page 1 of 1

It is certified that error appears in the above-identified patent and that said Letters Patent is hereby corrected as shown below:

Column 1 - Line 44 - Below "$R_f^1O[R_f^2O]_n[R_f^3O]_m(R_f^4)AQC(R^1)=CH_2$" insert -- I --.

Column 3 - Line 30 (Approx.) - Below "$R_f^1O[R_f^2O]_n[R_f^3O]_m(R_f^4)AQC(R^1)=CH_2$" insert -- I --.

Column 23 - Line 40 - In Claim 1, below "$R_f^1O[R_f^2O]_n[R_f^3O]_m(R_f^4)AQC(R^1)=CH_2$" insert -- I --.

Column 23 - Line 65 - In Claim 1, delete "said" and insert -- acid --, therefor.

Column 25 - Line 16-17 - In Claim 17, delete "perfluoropolyather" and insert -- perfluoropolyether --, therefor.

Column 25 - Line 23 (Approx.) - In Claim 17, below "$R_f^1O[R_f^2O]_n[R_f^3O]_m(R_f^4)AQC(R^1)=CH_2$" insert -- I --.

Signed and Sealed this

First Day of August, 2006

JON W. DUDAS  
*Director of the United States Patent and Trademark Office*